May 26, 1936.  L. MILLER  2,042,352
SAFETY DEVICE FOR TRUCK TRAILERS
Filed Oct. 28, 1935
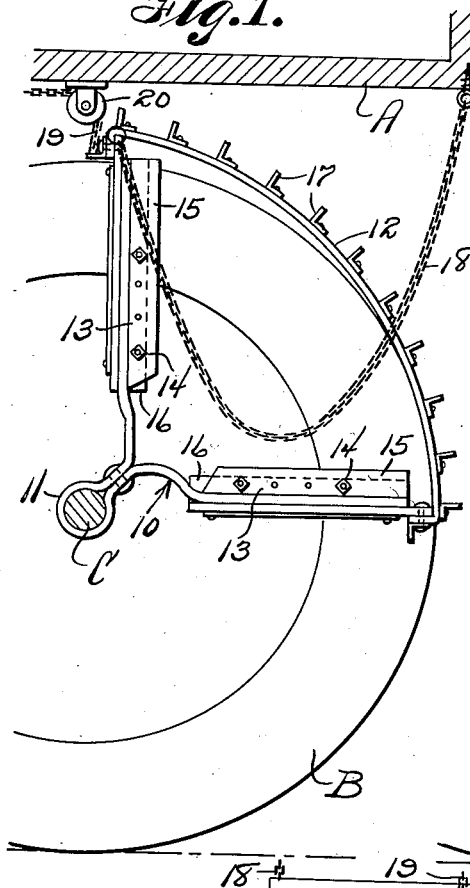
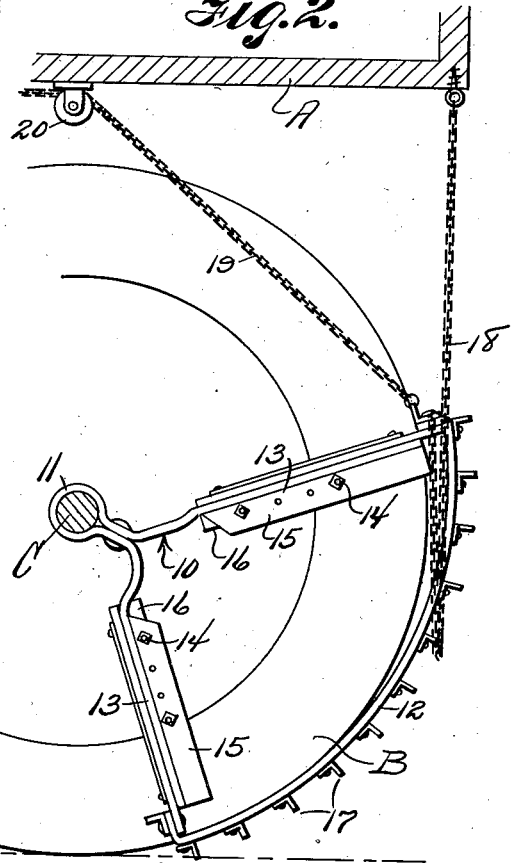
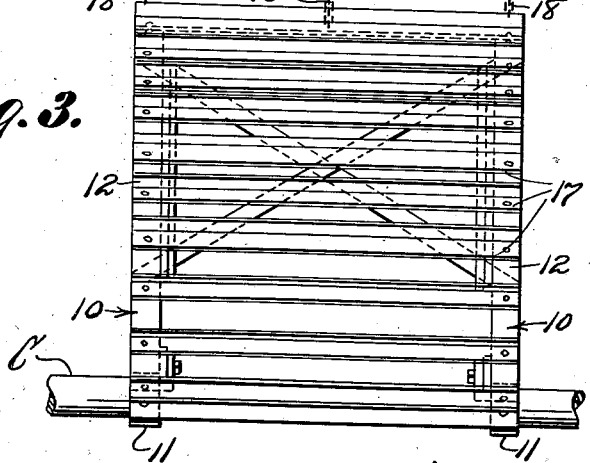
Lewis Miller INVENTOR
BY Victor J. Evans & Co.
WITNESS ATTORNEY

UNITED STATES PATENT OFFICE 2,042,352

SAFETY DEVICE FOR TRUCK TRAILERS

Lewis Miller, Cleveland, Ohio, assignor of one-third to John Jeisel and one-third to Frank L. Legan, Cleveland, Ohio Application October 28, 1935, Serial No. 47,174

3 Claims. (Cl. 188—30)

The invention relates to a safety device for truck trailers and more especially to a vehicle chock.

The primary object of the invention is the provision of a device of this character, wherein the same is worn by the rear axle of a truck trailer and is under the control of the driver of the truck so that it can be brought into operative position for checking backward movement of the trailer when upon a hill and when at a standstill.

Another object of the invention is the provision of a device of this character, wherein the same is adjustable to assure the blocking of backward movement of a truck trailer when upon the same so that when in lowered position will engage with the road bed to obviate the rearward motion of the vehicle, the adjustment of the device permits the use thereof with vehicles having rear axles at varying heights from the road bed.

A further object of the invention is the provision of a device of this character, which is simple in construction, thoroughly reliable and efficient in its operation, satisfying the requirements for the stopping of the rearward motion of a vehicle thus functioning as a brake, strong, durable, and inexpensive to manufacture.

With these and other objects in view, the invention consists in the features of construction, combination and arrangement of parts as will be hereinafter more fully described, illustrated in the accompanying drawing, which discloses the preferred embodiment of the invention and pointed out in the claims hereunto appended.

In the accompanying drawing:

Figure 1 is a fragmentary vertical sectional view through a truck trailer showing the device constructed in accordance with the invention applied thereto and in inoperative position.

Figure 2 is a view similar to Figure 1 showing the device in operative position.

Figure 3 is a rear elevation of the device when in inoperative position.

Similar reference characters indicate corresponding parts throughout the several views in the drawing.

Referring to the drawing in detail, A designates a portion of a truck trailer, B a portion of one rear wheel thereof and C the rear axle, respectively, these being of conventional construction and are shown merely to illustrate the application and use of the device constituting the present invention and hereinafter fully described.

The device comprises a pair of sector shaped end frames 10, each made from strap iron and both are formed with axle engaging hubs 11 fitted about the axle C and swingingly support the said frames 10 eccentrically with relation to the wheel B.

Each frame 10 is provided with the outwardly arched ground engaging portions 12 and the inner carrying part 13 therefor which are adjustably united by fasteners 14 passed through coupling flanges 15 and 16, respectively, the latter flange being upon the part 12 while the flange 15 is on the part 13.

Carried by the parts 12 of the frames 10 are uniformly spaced cross cleats 17, each of L shape in cross section and constitute calks for biting engagement with a road bed when the device is lowered to operative position as is shown in Figure 2 of the drawing, the inactive position of the device being shown in Figure 1 of said drawing.

Connected with the frames 10 and to the body A are chain lengths 18 which function to limit the swinging movement of the device when lowered to operative position while medially of these frames and joined with one of the cleats 17 is an operating chain 19, it being extended into convenient reach to the driver of the truck and this chain 19 functions to raise or lower the device when the same is in use to check the rearward movement of the truck trailer, the checking being effected when the device is in its lowered position. The chain 19 is trained over a guide pulley 20 suitably mounted on the bottom of the truck trailer, preferably in the position as shown in Figures 1 and 2 of the drawing.

It is preferable to hang the device midway of the axle C between the traction wheels, one being indicated at B in the drawing and such device swings vertically from normal inoperative position to operative position and vice versa.

What is claimed is:

1. In a safety device for vehicles the combination with operating means, of spaced sector shaped members at the rear of the vehicle and swingingly carried by its rear axle, a series of calks extending from one member to the other and arranged spaced from each other, and means for limiting the swing of the members.

2. In a safety device for vehicles the combination with operating means, of spaced sector shaped members at the rear of the vehicle and swingingly carried by its rear axle, a series of calks extending from one member to the other and arranged spaced from each other, means for limiting the swing of the members, and means for varying the size of said members.

3. In a safety device for vehicles the combination with operating means, of spaced sector shaped members at the rear of the vehicle and swingingly carried by its rear axle, a series of calks extending from one member to the other and arranged spaced from each other, means for limiting the swing of the members, means for varying the size of said members, and means connecting the operating means with said members.

LEWIS MILLER.